(12) United States Patent
Loccufier et al.

(10) Patent No.: US 12,486,419 B2
(45) Date of Patent: *Dec. 2, 2025

(54) FLUID SET FOR INKJET RECORDING

(71) Applicant: AGFA NV, Mortsel (BE)

(72) Inventors: Johan Loccufier, Mortsel (BE); Luc Decoster, Mortsel (BE)

(73) Assignee: Agfa NV, Mortsel (BE)

( * ) Notice: Subject to any disclaimer, the term of this patent is extended or adjusted under 35 U.S.C. 154(b) by 210 days.

This patent is subject to a terminal disclaimer.

(21) Appl. No.: 18/261,555

(22) PCT Filed: Jan. 17, 2022

(86) PCT No.: PCT/EP2022/050832
§ 371 (c)(1),
(2) Date: Jul. 14, 2023

(87) PCT Pub. No.: WO2022/161799
PCT Pub. Date: Aug. 4, 2022

(65) Prior Publication Data
US 2024/0384121 A1 Nov. 21, 2024

(30) Foreign Application Priority Data
Jan. 26, 2021 (EP) .................................. 21153367

(51) Int. Cl.
| | |
|---|---|
| *C09D 11/40* | (2014.01) |
| *B41J 2/01* | (2006.01) |
| *B41J 2/21* | (2006.01) |
| *B41M 3/00* | (2006.01) |
| *B41M 7/00* | (2006.01) |
| *C09D 11/107* | (2014.01) |
| *C09D 11/322* | (2014.01) |
| *C09D 11/326* | (2014.01) |
| *C09D 11/38* | (2014.01) |
| *C09D 11/54* | (2014.01) |

(52) U.S. Cl.
CPC ................ *C09D 11/40* (2013.01); *B41J 2/01* (2013.01); *B41J 2/2107* (2013.01); *B41M 3/001* (2013.01); *B41M 7/009* (2013.01); *C09D 11/107* (2013.01); *C09D 11/322* (2013.01); *C09D 11/326* (2013.01); *C09D 11/38* (2013.01); *C09D 11/54* (2013.01)

(58) Field of Classification Search
CPC ........ B41J 25/001; B41J 25/34; B41J 25/003; B41J 2/21; B41J 2/18; B41J 25/312; B41J 2025/008; B41J 2202/21; B41J 2/17596; B41J 2/16508; B41J 2/1652; B41J 2/16538; B41J 2/175; B41J 2/17563; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41M 5/0011; B41M 5/0017; B41M 5/0023; B41M 5/0047; B41M 7/00; B41M 7/0072; B41M 5/52; B41M 5/5218; B41M 5/5227; C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 6,037,390 A | 3/2000 | Page et al. | |
| 2007/0211126 A1 | 9/2007 | Bauer et al. | |
| 2012/0140008 A1* | 6/2012 | Ganapathiappan | .... C09D 11/30 524/558 |
| 2013/0258017 A1* | 10/2013 | Kagose | ................ C09D 11/322 522/174 |
| 2018/0094154 A1* | 4/2018 | Loccufier | ............. C09D 11/322 |

(Continued)

FOREIGN PATENT DOCUMENTS

| | | |
|---|---|---|
| EP | 0927786 A2 | 7/1999 |
| EP | 1125760 A1 | 8/2001 |

(Continued)

OTHER PUBLICATIONS

European Patent Office, International Search Report in International Patent Application No. PCT/EP2022/050832, mailed Apr. 22, 2022, 4 pp.

(Continued)

*Primary Examiner* — Manish S Shah
(74) *Attorney, Agent, or Firm* — Leydig, Voit & Mayer, Ltd.

(57) ABSTRACT

A fluid set for inkjet printing comprises an aqueous ink jet ink and a co-reactive fluid. The ink jet ink comprises a pigment and a polymeric dispersing agent having a functional group capable of reacting with a primary or secondary amine. The co-reactive fluid comprises a compound having at least two functional groups selected from the group consisting of primary amines and secondary amines. The co-reactive fluid is preferably a primer, an inkjet ink or an over print varnish.

14 Claims, No Drawings

(56) References Cited

U.S. PATENT DOCUMENTS

2019/0249024 A1    8/2019  Shinohara et al.
2019/0367762 A1*  12/2019  Loccufier ............. C09D 11/037

FOREIGN PATENT DOCUMENTS

| EP | 2468523 A1 | 6/2012 |
|---|---|---|
| EP | 2626390 A2 | 8/2013 |
| EP | 4077554 A2 | 10/2022 |
| EP | 4146752 A1 | 3/2023 |
| JP | H11-269417 A | 10/1999 |
| JP | 2009-529443 A | 8/2009 |
| JP | 2020-507667 A | 3/2020 |
| JP | 2020-509148 A | 3/2020 |
| WO | WO 2007/103542 A1 | 9/2007 |
| WO | WO 2018/137993 A1 | 8/2018 |
| WO | WO 2018/138054 A1 | 8/2018 |
| WO | WO 2020/054106 A1 | 3/2020 |
| WO | WO 2020/114839 A1 | 6/2020 |
| WO | WO 2021/122411 A2 | 6/2021 |
| WO | WO 2021/224046 A1 | 11/2021 |

OTHER PUBLICATIONS

European Patent Office, Written Opinion in International Patent Application No. PCT/EP2022/050832, mailed Apr. 22, 2022, 5 pp.

* cited by examiner

FLUID SET FOR INKJET RECORDING

CROSS-REFERENCE TO RELATED APPLICATIONS

This patent application is the U.S. national stage of copending International Patent Application No. PCT/EP2022/050832, filed Jan. 17, 2022, which claims the benefit of European Patent Application No. 21153367.4, filed Jan. 26, 2021.

TECHNICAL FIELD

The present invention relates to aqueous ink jet technology for printing on non-absorbing substrates.

BACKGROUND ART

Images, printed on non-absorbing substrates have to meet a whole set of requirements, including an excellent adhesion performance and chemical resistance. In order to meet these requirements, additional resins are integrated into aqueous ink jet inks which function as a binder. However, integrating resins into aqueous ink jet inks often significantly impact the jetting reliability and colloid chemical stability of aqueous pigmented inks, making the approach less suited for industrial applications where reliability and stability are of utmost importance. It would be advantageous if the same physical properties of inkjet printed images could be reached without the need for additional resins in the ink.

Encapsulated β-keto-ester functionalized polymers have been disclosed in WO2021/122411, as a particularly interesting resins for integrating into aqueous based ink jet inks. Printing on non-absorbing substrates often need primers in order to guarantee the image quality. Primers are typically composed of cationic compounds, often cationic polymers, and multivalent metal ions. In WO2021/224046, primary and secondary amine functionalized polymers have been disclosed as particularly preferred polymers for use in primers in combination with encapsulated β-keto-ester functionalized polymers. However, the approach still needs the additional resins in the ink jet ink to meet the requirements for industrial applications.

SUMMARY OF INVENTION

Now, it has been found that a fluid set comprising at least one aqueous ink jet ink and at least on co-reactive fluid, characterized in that a. the ink jet ink comprises at least one pigment dispersion, dispersed with a polymer dispersing agent having at least three functional groups capable of reacting with primary or secondary amines, and b. the co-reactive fluid comprises at least one polymer, functionalized with at least two functional groups selected from primary and secondary amines leads to chemical resistant images on non-absorbing substrates.

According to another aspect, the present invention includes a method of printing images by means of a fluid set including an aqueous ink jet ink and a co-reactive fluid as defined in claim 1. This method is defined in claim 13.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

It has been found that a fluid set comprising an aqueous ink jet ink and a co-reactive fluid, the aqueous inkjet ink comprising a pigment and a polymeric dispersing agent having a functional group capable of reacting with primary or secondary amines, the co-reactive fluid comprises a compound having at least two functional groups selected from the group consisting of primary and secondary amines, leads to chemical resistant images on non-absorbing substrates. The co-reactive fluid may be used as a primer, an additional inkjet ink or an over-print varnish.

A. AQUEOUS INKJET INK

A.1. Functionalized Polymeric Dispersing Agent

The aqueous inkjet ink making part of the fluid set according to the invention comprises a pigment which is dispersed by means of a functionalized polymeric dispersing agent. The functionalized polymeric dispersing agent comprises functional groups capable of reacting with primary or secondary amines. These functional groups are an epoxy group, an activated double bond such as a maleimide or acrylate or a functional group according to general formula I, or II, or III:

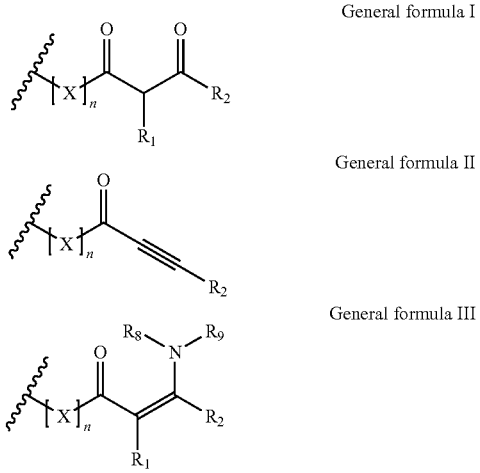

General formula I

General formula II

General formula III wherein
$R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$ and CN $R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group and $COR_3$ $R_1$ and $R_2$ may represent the necessary atoms to form a five to eight membered ring $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$ and $NR_5R_6$ $R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ may represent the necessary atoms to form a five to eight membered ring X is selected from the group consisting of O and $NR_7$ n represents 0 or 1

$R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group.

$R_8$ and $R_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_8$ and $R_9$ may represent the necessary atoms to form a five to eight membered ring.

In a preferred embodiment, the polymeric dispersing agent according to the present invention comprises at least three functional groups according to general formula I. In a more preferred embodiment, said polymeric dispersing agent comprises at least 5 mol % monomeric units having a functional group according to general formula I relative to the total monomer composition, more preferably at least 10 mol % relative to the total monomer composition and most preferably at least 15 mol % monomeric units having a functional group according to general formula I, relative to the total monomer composition. An amount of at least 15 mol % monomeric units having a functional group according to general formula I realizes a sufficient reactivity leading to even higher chemical resistance of the obtained images.

The polymeric dispersing agent can be prepared by post derivatization of natural or synthetic polymers or by polymerization of functionalized monomers. The polymeric dispersing agent can be selected from the group consisting of an addition polymer, a polycondensation polymer and combinations thereof. The polymers can be prepared by ring opening polymerization, free radical polymerization, cationic polymerization and anionic polymerization.

Typical polycondensation type of polymers are selected from the group consisting of poly(amides), poly(esters) and poly(urethanes). Typical polymers prepared by ring opening polymerization are poly(ethers), poly(esters) and poly(amides). Typical polymers prepared by free radical polymerization are acrylic based polymers, derived from acrylates, methacrylates, acrylamides and methacrylamides, styrene based polymers and vinyl ester based polymers. Other monomers can be included in the polymers such as vinyl ethers, maleimides, itaconates, allyl ethers and allyl esters.

The polymeric dispersing agents according to the present invention preferably comprise hydrophilic type of monomeric units and hydrophobic type of monomeric units. The hydrophilic monomers can be non-ionic, anionic, cationic and zwitterionic but are preferably anionic or non-ionic, anionic being the most preferred. Particularly preferred anionic groups are selected from the group consisting of carboxylic acids or salts thereof, sulfonic acids or salts thereof, phosphonic acids or salts thereof, phosphoric acid esters or salts thereof and sulfuric acid esters or salts thereof, carboxylic acids or salts thereof and sulfonic acids or salts thereof being more preferred, carboxylic acids or salts thereof being the most preferred. Particularly preferred non-ionic groups are selected from the group consisting of poly(ethylene glycols) and oligohydroxy-groups.

Polymeric dispersing agents, prepared by free radical polymerization are particularly preferred.

Particularly preferred anionic hydrophilic co-monomers for free radical polymerisation are selected from the group consisting of acrylic acid, methacrylic acid, itaconic acid, β-carboxy ethyl acrylate, maleic acid, mono-esters of maleic acid, fumaric acid and mono-esters thereof, vinyl sulfonic acid, styrene sulfonic acid, vinyl phosphonic acid, hydroxyethyl acrylate monophosphate, hydroxyethyl acrylate monosuccinate and the like, caprolactone acrylate, (2-acryloyloxyethyl)phtalic acid, (2-acryloyloxyethyl)hexahydro phtalic acid, carboxymethyl-2-propenoate, 4-[[6-(acryloyloxy)hexyl]oxy]-benzoic acid, 4-carboxyphenyl acrylate and maleic mono(2-acryloyloxyethyl) ester, acrylic acid and methacrylic acid being the most preferred.

Particularly preferred non-ionic hydrophilic monomers for free radical polymerization are selected from the group of poly(ethylene glycol) functionalized acrylates and methacrylates and saccharide functionalized acrylates, methacrylates, acrylamides and methacrylamides. Poly(ethylene glycol) monomethyl ether functionalized acrylates and methacrylates are particularly preferred.

Preferred hydrophobic monomers are monomers that form a two phase system with water when mixed in a water over monomer ratio of 5 over 1, more preferably when mixed in a water over monomer ratio of 10 over 1. Particularly preferred hydrophobic monomers for free radical polymerization are selected from the group consisting of alkyl esters of (meth)acrylic acid, aryl, alkaryl and aralkyl functionalized (meth)acrylic acid esters, alkyl, aryl, alkaryl and aralkyl functionalized acrylamides and methacrylamides, styrene derivatives and vinyl naphthalene derivatives.

The polymeric dispersants according to the present invention can be random copolymers, block-copolymers, graft-copolymers, gradient copolymers and comb copolymers or combinations thereof. They can be linear, star shaped, branched or hyperbranched.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

In another embodiment of the present invention, the molecular weight of the resins according to the present invention is controlled using RAFT agents, ATRP, nitroxyl radical technology or transfer agents, preferably thiols.

In a particularly preferred embodiment, the dispersing agents according to the present invention are prepared by polymerizing monomers comprising at least one functional group according to general formula I.

Typical monomers for addition polymerization are given in Table 1 without being limited thereto.

TABLE 1
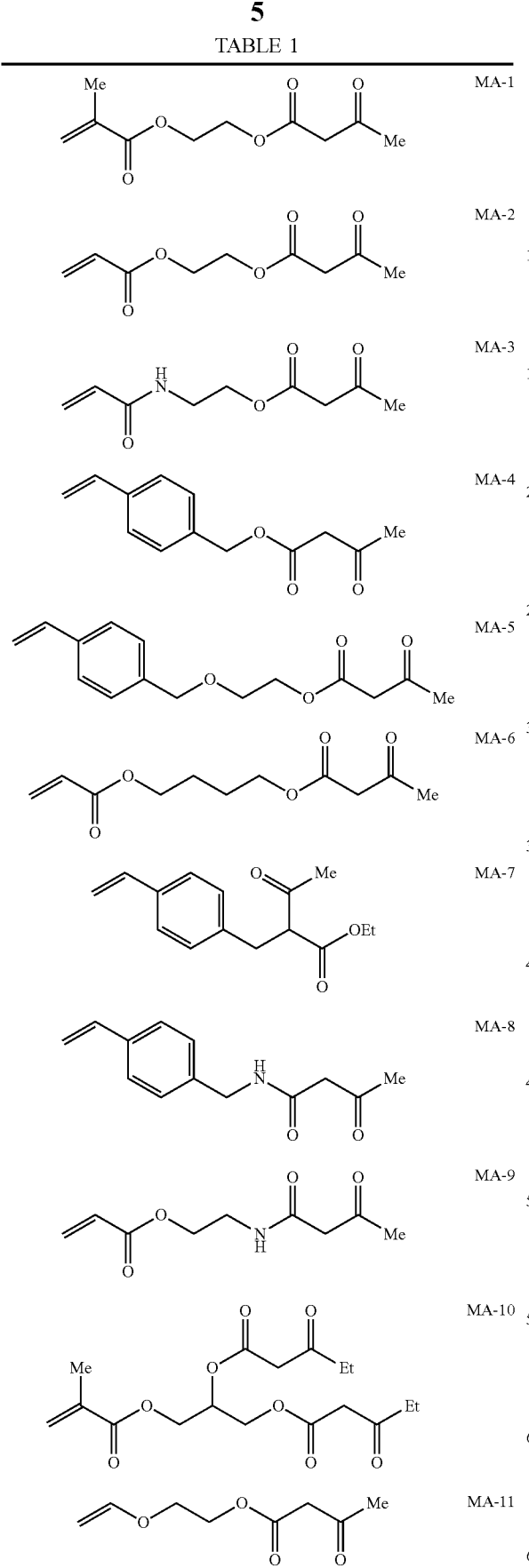
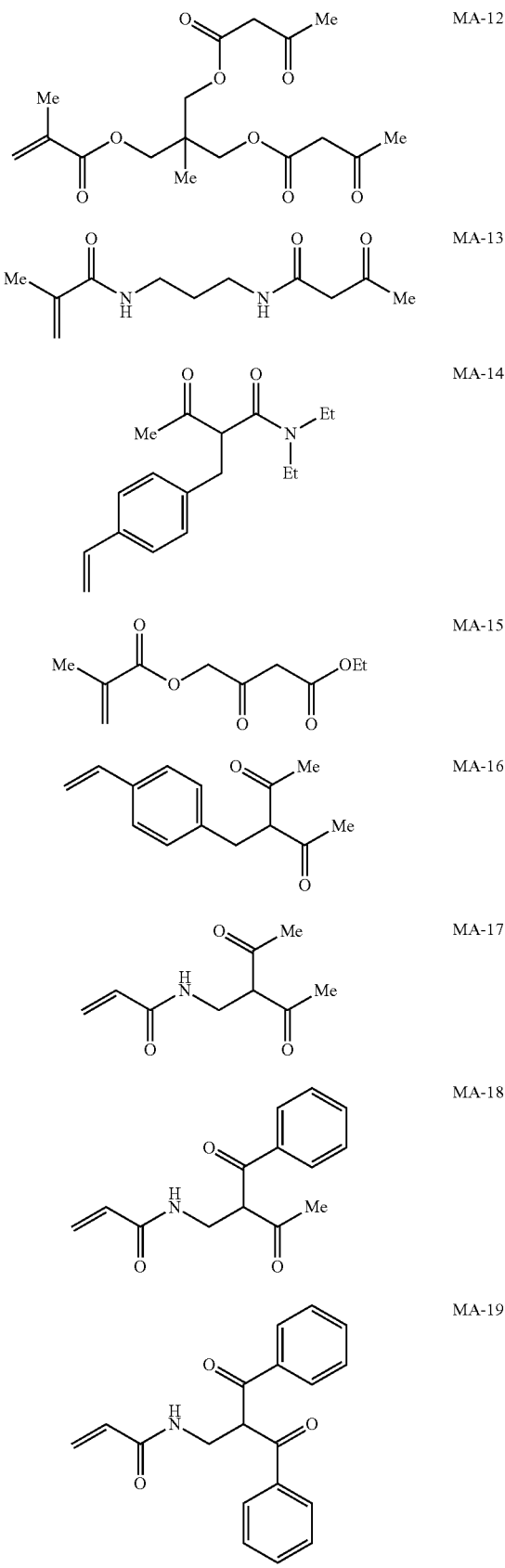

TABLE 1-continued

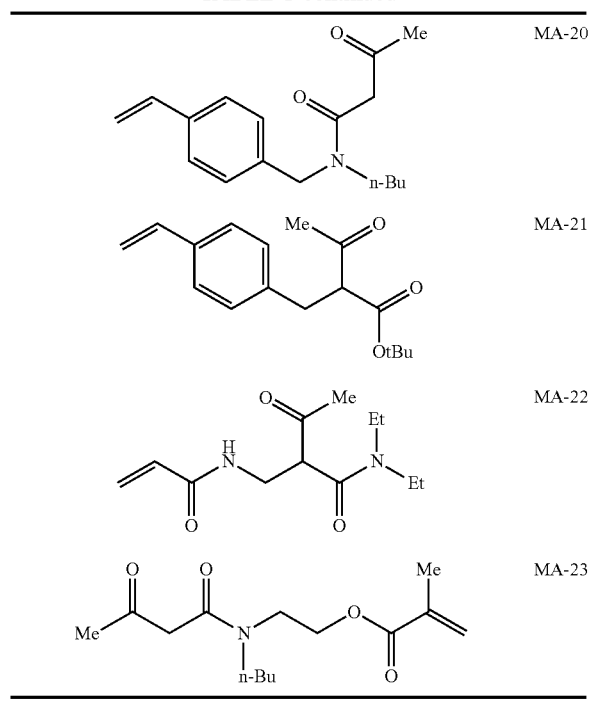

Typical monomers for ring-opening polymerization are given in Table 2 without being limited thereto.

TABLE 2

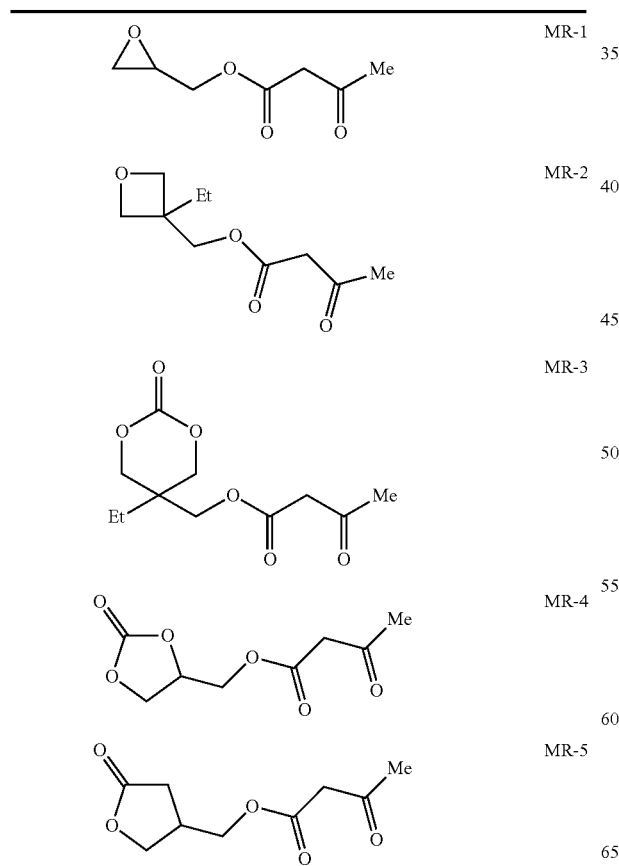

TABLE 2-continued

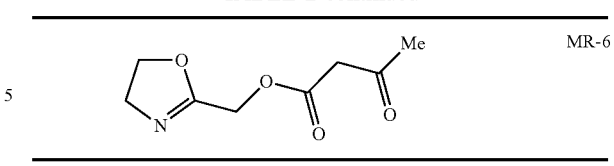

Typical monomers for polycondensation are given in Table 3 without being limited thereto.

TABLE 3

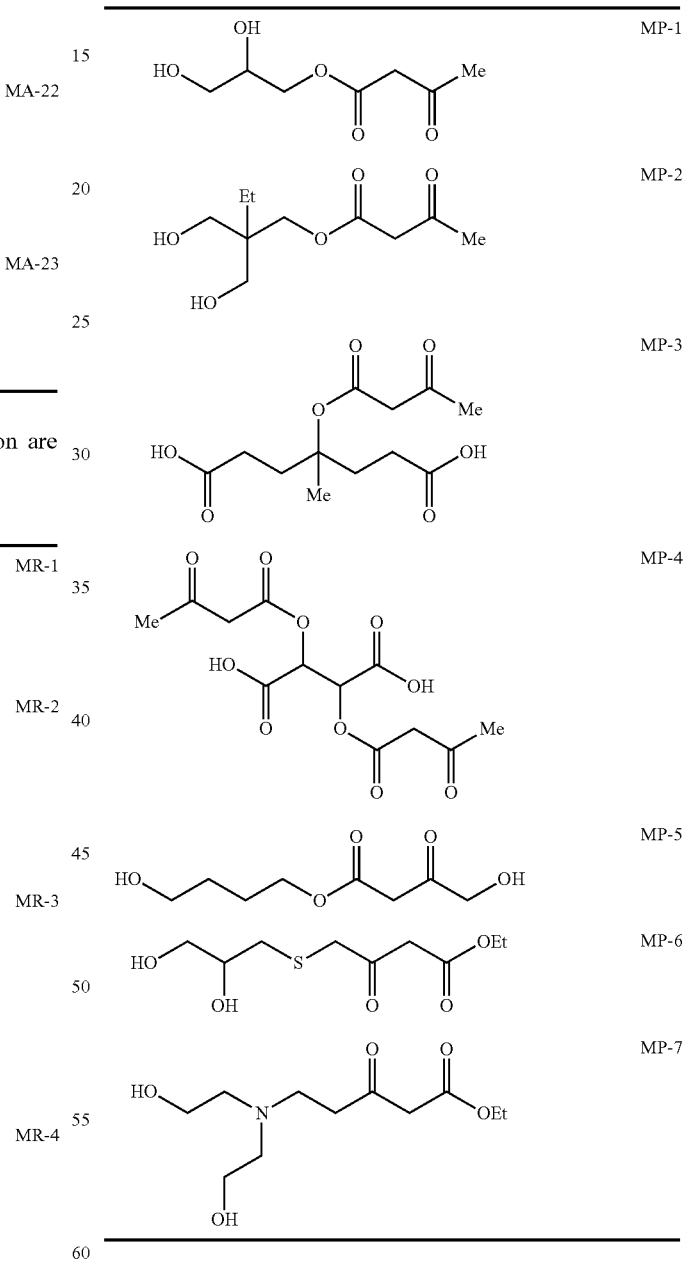

A.2. Pigment

The aqueous ink making part of the fluid set according to the invention comprises a pigment which can be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs to of WO 2008/074548.

The pigment particles are dispersed, preferably, in an aqueous medium by means of the polymeric dispersing agent of § A.1. Self-dispersible pigments are sometimes used to avoid interaction with additional resins in the ink. The present invention makes it possible to use inkjet inks without additional resins, hence self-dispersible pigments, which are often more expensive than non-self-dispersible pigments are not required.

The pigment particles in the ink according to the invention should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. The average particle size of pigment particles is determined with a Brookhaven Instruments Particle Sizer BI90plus based upon the principle of dynamic light scattering. The ink is diluted with demi water to a pigment concentration of 0.002 wt %. The measurement settings of the BI90plus are: 5 runs at 23° C., angle of 90°, wavelength of 635 nm and graphics=correction function.

However, for white pigment inkjet inks, the numeric average particle diameter of the white pigment is the same as above.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and [0118] in of WO 2008/074548.

Also special colorants may be used, such as fluorescent pigments for special effects in clothing, and metallic pigments for printing a luxury look of silver and gold colours on textiles.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

The polymeric dispersing agent according to the invention is used in an amount of 5 to 600 wt. %, preferably 10 to 100 wt. % based on the weight of the pigment.

A.3. Pigment Dispersion

The pigmented inkjet ink according to the present invention may be prepared by precipitating or milling the pigment in the dispersion medium in the presence of the polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is preferably performed with cooling to prevent build-up of heat.

In the process of mixing, milling and dispersion, each process is performed with cooling to prevent build-up of heat, and for radiation curable inkjet inks as much as possible under light conditions in which actinic radiation has been substantially excluded.

The inkjet ink according to the present invention may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier such as water. For the inkjet ink according to the invention, the pigment is usually present in the mill grind at 1 to 50 wt. %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make the inkjet ink in the form of a concentrated mill grind, which is subsequently diluted to the appropriate concentration for use in the inkjet printing system, e.g. by a mix of water and an organic solvent of § A.4. This technique permits preparation of a greater quantity of pigmented ink from the equipment. By dilution, the inkjet ink is adjusted to the desired viscosity, surface tension, colour, hue, saturation density, and print area coverage for the particular application.

A.4. Water Soluble Organic Solvent

The inkjet ink of the invention may contain, besides water as a solvent, also a water-soluble organic solvent. Examples of water-soluble organic solvents include polyhydric alcohols such as diethylene glycol, triethylene glycol, dipropylene glycol, glycerol, 1,3-propanediol, 1,3-butanediol, 1,4-butanediol, 2,2-dimethyl-1,3-propanediol, 2-methyl-1,3-propanediol, 1,2-pentanediol, 2,4-pentanediol, 1,5-pentanediol, 1,6-hexanediol, 2-ethyl-1,3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2,4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous ink jet ink is preferably 20 wt. % and less than 70 wt. %. If the content is less than 20 wt. %, reliable jetting might be difficult, due to for instance a viscosity mismatch between ink and head. If the content exceeds 70 wt. %, the ink loses its water based, more green character.

The water-soluble organic solvent is preferably a mixture of organic solvents comprising 2-pyrrolidone and 1,2-hexanediol, optionally together with glycerol.

A.5. Humectant

The ink jet ink of the invention may contain at least one humectant to prevent the clogging of nozzles in an inkjet print head, due to its ability to slow down the evaporation rate of the inkjet ink, especially the water in the inkjet printing liquid. The humectant is an organic solvent having a higher boiling point than water.

Suitable humectants are disclosed in of WO2015/158649A. A preferred humectant is glycerol or a derivative or isomer of 2-pyrolidone.

The humectant is preferably added to the inkjet printing liquid in an amount of 0.1 to 20 wt. % based on the total weight of the inkjet printing liquid.

A.6. Surfactant

In the ink used in the present invention, a surfactant may be added in order to ensure wettability onto the substrate. The amount of the surfactant added is preferably from 0 wt. % to 5 wt. % as an active component in the ink. If the amount exceeds 5 wt. %, the ink easily foams to cause non-discharge. The surfactant that can be used is not particularly limited as long as it satisfies the above limitation.

While any of an amphoteric surfactant, a non-ionic surfactant, and an anionic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability of the colour material and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

Other suitable surfactants are acetylene alcohol surfactants. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2,4,7,9-tetramethyl-5-decine-4,7-diol, alkylene oxide adducts of 2,4,7,9-tetramethyl-5-decine-4,7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E 010, or from Nissin Chemical Industry as Surfynol (registered trademark) 465 and Surfynol 61.

B. CO-REACTIVE FLUID

B.1. Compound Having at Least Two Functional Groups, being a Primary Amine or a Secondary Amine The co-reactive fluid from the fluid set according to the invention comprises a compound having at least two functional groups, being a primary amine or a secondary amine, a primary amine more preferred.

The compound having at least two functional groups selected from the group consisting of a primary amine and secondary amine, can be selected from a di- or multifunctional low molecular weight compound and an oligomer or polymer.

In a more preferred embodiment, said amino compound is a low molecular weight compound having a functionality of 2 to 8, more preferably 2 to 5 and most preferably is di- or trifunctional. These compounds being more available into the market.

Typical amino compounds are given in Table 4 of WO2021/224046A and is hereby incorporated by reference.

In another preferred embodiment, said compound having at least two functional groups selected from the group consisting of a primary amine and secondary amine is a polymer having at least 5, more preferably at least 10 and most preferably at least 15 functional groups, selected from the group consisting of a primary amine and a secondary amine, a primary amine being more preferred. When the amount of primary or secondary amines is above these values, reactivity is increased resulting in even higher solvent and water resistance of the obtained coatings and images.

The polymer can be dissolved in the co-reactive fluid or can be present as a dispersed or emulsified polymer particle. Typical polymers, useful in the design of the co-reactive fluid as a primer, are selected from the group consisting of poly(allylamine), poly(vinylamine), poly(vinylamine-co-vinylformamide), chitosan, homo- or copolymers of 4-aminomethyl-styrene or salt thereof, 2-aminoethyl-acrylate or salt thereof, 2-aminoethyl-methacrylate or salt thereof, 3-aminopropyl-acrylamide or salt thereof, 3-aminopropyl-methacrylamide or salt thereof, poly(lysine) or copolymers thereof and the like. Suitable examples of polymers comprising vinyl amine, an allyl amine and an oxalyl amide crosslinking unit are to be found in [0018-0028] of the unpublished patent application EP20172947.2.

In a preferred embodiment, the co-reactive fluid comprises at least one resin particle, having at least 5, more preferably at least 10 and most preferably at least 15 functional groups selected from the group consisting of a primary amine and a secondary amine, a primary amine being more preferred. The use of a resin particle instead of a compound in the fluid has the advantage of an improved rheological behaviour leading to an improved jetting reliability and colloidal stability of the fluid. This is of great importance if the fluid has to be jetted in the image forming method by means of an inkjet head or valve-jet head, for example if the fluid is a primer (pre-treatment liquid), an aqueous inkjet ink or an overcoat which is image wise applied.

The amino containing resin particle can be prepared by derivatisation of amino containing polymers, followed by dispersing of said derivative in an aqueous environment, optionally followed by crosslinking of the particle. Preferred starting polymers are homo- or co-polymers of vinyl amine or allylamine. Typical examples include poly(allylamine), poly(vinylamine), poly(vinylamine-co-vinylformamide), chitosan, homo- or copolymers of 4-aminomethyl-styrene or salt thereof, 2-aminoethyl-acrylate or salt thereof, 2-aminoethyl-methacrylate or salt thereof, 3-aminopropyl-acrylamide or salt thereof, 3-aminopropyl-methacrylamide or salt thereof, poly(lysine) or copolymers thereof and the like. The weight average molecular weight of the starting polymers is preferably at least 7000, more preferably at least 15000 and most preferably at least 25000.

Other synthetic strategies include derivatisation of carboxylic acid functionalized acrylic polymers with azeridine followed by emulsification and optionally crosslinking, emulsion or mini-emulsion polymerization of optionally protected amino functionalized monomers, optionally followed by deprotection, post derivatisation of reactive latexes, comprising reactive monomers such as 4-chloromethyl-styrene and sol gel based polycondensations based on amino functionalized alkoxysilanes. Suitable examples of these amino functionalized siloxane resin particles are to be found in [0013-0026] of the unpublished patent application EP-A-20172949.8.

In a preferred embodiment, said amino functionalized resin particles are crosslinked. Crosslinked particles give more formulation latitude. Indeed, due to crosslinking, resin particles will be more resistant to water soluble organic solvents present in the carrier of the co-reactive fluid. In a further preferred embodiment at least 5 mol %, more preferably at least 10 mol % and most preferably at least 20 mol % of the repeating units in the polymer resin particle have a functional group being a primary amine or a secondary amine.

The amines can be at least partially neutralized with an acid such as hydrochloric acid, methane sulfonic acid, p.-toluene sulfonic acid, phosphoric acid, sulfuric acid and carboxylic acids such as acetic acid, citric acid and lactic acid.

B.2. Additives

The co-reactive fluid may comprise additives which are specific for the functioning of the fluid.

B.2.1. Additives for the Co-Reactive Fluid Acting as Primer.

If the co-reactive fluid according to the invention functions as a primer, the fluid may further comprise a flocculating agent which reacts with the colorant of the aqueous ink of the fluid set. The flocculating agent induces a viscosity increase, a precipitation or an immobilization of the colorant of the ink when the aqueous ink comes into contact with the co-reactive fluid acting as primer.

The flocculating agent is preferably a resin or a multivalent metal ion. Suitable examples of multivalent metal ions are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3$), and an acetate ion ($CH_3COO^-$).

These polyvalent metal ions have a function of aggregating the colorant, more specifically the pigment, by acting on the carboxyl groups on the surface of the pigment in the ink jet ink, or on the polymeric dispersant contained in the ink. As a result, the colorants of the ink are fixed resulting in a decreased color bleeding and beading. Therefore, it is preferred that the surface of the pigment in the ink and/or the polymeric dispersant, have an anionic group, preferably a carboxyl group.

The resin as a flocculating agent can be selected from the group of starches; cellulosic materials such as carboxymethyl cellulose and hydroxymethyl cellulose; polyurethanes, polysaccharide; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Other suitable resins are acrylic polymers as described in EP2362014 [0027-0030]. Preferably the resin is a cationic resin, more preferably a cationic charged polyurethane. The resin content is preferably not more than 20 wt. % relative to the total mass of the fluid acting as primer (100 mass %).

The co-reactive fluid acting as a primer may also comprise colorants, more specifically white colorants to obtain vivid coloured images when the primer is over-printed with the aqueous inkjet ink of the fluid set according to the invention on dark or coloured substrates like card board, black coloured textile, . . . or a transparent substrate. More specifically the fluid acting as a primer preferably comprises white pigments. Suitable white pigments are given by Table 2 in of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in and in of WO 2008/074548. Titanium dioxide ($TIO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1µ or less, depending on the desired end use application of the fluid. For applications demanding high hiding or decorative printing applications, the titanium dioxide particles preferably have an average size of less than about 1 µm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. A fluid comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TIO_2$.

The titanium dioxide pigment may also bear one or more metal oxide surface coatings. These coatings may be applied using techniques known by those skilled in the art. Examples of metal oxide coatings include silica, alumina, aluminasilica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the compound having at least two functional groups selected from the group consisting of a primary amine and a secondary amine, which has a positive charge at usual pH of a primer. No additional surface treatment of the pigment, is then required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), $R_{706}$ (available from DuPont, Wilmington Del.) and W-6042 (a silica alumina treated nano grade titanium dioxide from Tayco Corporation, Osaka Japan).

When the co-reactive fluid acting as a primer is jetted via an inkjet head or valve jet head, other additives may be added such as the ones described in § A.4.; A.5. and A.6.

B.2.2. Additives for the Co-Reactive Fluid Acting as an Aqueous Inkjet Ink

The co-reactive fluid according to the invention may also function as an aqueous inkjet ink in the formation of an image, also called co-reactive inkjet ink due to its ability to react with the first aqueous inkjet ink of the set.

The fluid acting as an inkjet ink preferably comprise the colorants as described in § A.2. and additives as described in § A.4.; A.5. and A.6.

B.2.3. Additives for the Co-Reactive Fluid Acting as an Overcoat

If the co-reactive fluid according to the invention functions as an overcoat which is coated or printed on top of the jetted aqueous inkjet ink according to the invention, the fluid may further comprise a resin. Suitable resins can be acrylic based resins, a urethane-modified polyester resin or a polyethylene wax.

The polyurethane resin may be incorporated in the fluid formulation acting as an overcoat as a dispersion and may be selected from the group consisting of aliphatic polyurethane dispersions, aromatic polyurethane dispersions, cationic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim CA); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the co-reactive fluid acting as an overcoat is at least 1 wt. % and preferably lower than 30 wt. %, more preferably lower than 20 wt. %.

The overcoat can be applied onto the jetted aqueous inkjet ink by a coating technique or printed using a printing technique such as: gravure printing, flexographic printing, offset printing or ink jet printing. In a particular preferred embodiment, the varnish is printed using ink jet printing.

C. IMAGE RECORDING METHOD

The fluid set according to the invention is suitable to be used in an inkjet image recording method. The inkjet recording method according to the invention comprises the steps of:
  jetting the aqueous inkjet ink making part of the fluid set according to the invention, on a substrate, preferably a non-porous substrate, the ink comprising a pigment and a polymeric dispersing agent having a functional group capable of reacting with a primary or secondary amine, preferably the functional group is, represented by general formula I, general formula II or general formula III.; and
  applying the co-reactive fluid of the fluid set according to the invention on a substrate preferably a non-porous substrate (the fluid is then acting as a primer) or onto the jetted aqueous inkjet (the fluid is then acting as an overcoat) or the fluid is jetted together with the aqueous inkjet ink to form a coloured image (the fluid is then acting as an aqueous inkjet ink, more particularly as a co-reactive inkjet ink).
  drying the applied fluid set by applying heat such as to obtain a temperature of the jetted ink of at least 60° C., more preferably at least 80° C. If the obtained temperature is below 60° C., no or insufficient crosslinking reaction occurs between the polymeric dispersing agent in the aqueous inkjet ink and the compound having at least two functional groups being a primary amine or a secondary amine. Consequently, no improvement of solvent resistance or adhesion of the jetted and dried ink is occurring.

In a preferred inkjet recording method, the method comprises the steps of:
  a) applying the co-reactive fluid according to the invention as a primer onto a substrate, preferably a non-porous substrate. The co-reactive fluid comprises a compound having at least two functional groups being a primary amine or a secondary amine, a primary amine being more preferred. The co-reactive fluid can be coated by any suitable coating method or printed using a printing technique such as: gravure printing, flexographic printing, offset printing or ink jet printing. In a particular preferred embodiment, the co-reactive fluid is printed using ink jet printing and the compound is a resin particle. This last means of applying the co-reactive fluid has the advantage that the amount of required fluid is substantially lower than with other application methods of priming the substrate. Optionally the co-reactive fluid can be dried by applying heat to a dry or semi-dry condition.

b) jetting the aqueous inkjet ink of the fluid set according to the invention onto the applied fluid, the ink comprising a pigment and a polymeric dispersing agent having a functional group capable of reacting with a primary or secondary amine, preferably the functional group is, represented by general formula I, general formula II or general formula III; and;

c) drying the jetted inkjet ink by applying heat such as to obtain a temperature of the jetted ink of at least 60° C., more preferably at least 80° C.

In another preferred inkjet recording method, the method comprises the steps of:

a) forming an image by ink jetting the fluid set onto a substrate, preferably a non-porous substrate. The co-reactive fluid of the fluid set comprises a compound having at least two functional groups being a primary amine or a secondary amine, a primary amine being more preferred and preferably further comprising a colorant. More preferably, the compound is a resin particle. The aqueous inkjet ink of the fluid set according to the invention comprises a pigment and a polymeric dispersing agent having a functional group capable of reacting with a primary or secondary amine, preferably the functional group is, represented by general formula I, general formula II or general formula III. The jetting of the fluid set in forming the image, can be performed by jetting the co-reactive fluid and the aqueous inkjet ink sequentially or simultaneously; and b) drying the jetted fluid set by applying heat such as to obtain a temperature of the jetted ink of at least 60° C., more preferably at least 80° C.

In another preferred inkjet recording method, the method comprises the steps of:

a) jetting the aqueous inkjet ink of the fluid set according to the invention onto a substrate, preferably a non-porous substrate. The ink comprises a pigment and a polymeric dispersing agent having a functional group capable of reacting with a primary or secondary amine, preferably the functional group is, represented by general formula I, general formula II or general formula III; Optionally the inkjet ink can be dried by applying heat to a dry or semi-dry condition; and b) applying the co-reactive fluid according to the invention as an overcoat onto the jetted aqueous inkjet ink. The co-reactive fluid comprises a compound functionalized with at least two functional groups being a primary amine or a secondary amine, a primary amine being more preferred. The co-reactive fluid can be coated by any suitable coating method or printed using a printing technique such as: gravure printing, flexographic printing, offset printing or ink jet printing. In a particular preferred embodiment, the co-reactive fluid is printed using ink jet printing and the compound having at least two functional groups being a primary amine or a secondary amine is a resin particle; and c) drying the applied fluid set by applying heat such as to obtain a temperature of the jetted ink of at least 60° C., more preferably at least 80° C.

In another preferred inkjet recording method, two or three of the preferred methods described above can be combined.

The substrate in the inkjet recording method may be porous, such as e.g. textile, paper, leather and card board substrates, but is preferably a non-absorbing substrate such as polyethylene terephthalate, polyethylene, polypropylene, polycarbonate, polyvinyl chloride, polyesters like polyethylene terephthalate (PET), polyethylene naphthalate (PEN), polylactide (PLA) or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm³ or more.

Examples of the heating process to dry the fluid set according to the invention, or at least dry the fluid or aqueous inkjet ink, include, but are not limited to, heat press, atmospheric steaming, high-pressure steaming, THERMOFIX. Any heat source can be used for the heating process; for example, an infrared ray source is employed.

The drying step can be performed at the ambient air, but the heating step to achieve a temperature of the applied fluid set or at least one of the fluid or aqueous inkjet ink of at least 60° C., more preferably 80° C., must be performed by using a heat source. Examples of suitable heat sources include equipment for forced-air heating, radiation heating such as IR-radiation, including NIR- and CIR radiation, conduction heating, high-frequency drying, and microwave drying.

A preferred ink jet head for the inkjet printing system to jet the inkjet ink and optionally the fluid acting as primer and/or overcoat is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the aqueous inkjet ink and optionally the fluid according to the present invention is not restricted to piezoelectric inkjet printing. Other inkjet print heads can be used and include various types, such as a continuous type, a thermal print head type, a MEM-jet type head and a valve jet type.

D. EXAMPLES

D.1. Materials

All compounds are supplied by TCI Europe unless otherwise specified.

BHT is 2,6-di-tert.butyl-4-methyl-phenol.
PV Fast blue BG-NIP: PB15:3, supplied by Clariant
Tego Wet 270 is an ether modified poly(dimethylsiloxane) supplied by Evonik Industries
MA-20 is a monomer and is prepared as follows:
Synthesis of N-[(4-vinylphenyl)methyl]butan-1-amine chlorohydrate:

A solution of 114.45 g 4-chloromethyl-styrene and 2 g BHT in 115 ml 1-methoxy-2-propanol was added to 219 g 1-butyl amine over 15 minutes, while keeping the temperature below 50° C. The reaction was allowed to continue at room temperature for 16 hours. 135 g of a 30 wt. % solution of sodium methanolate in methanol was added and the mixture was stirred for 15 minutes at room temperature. The formed sodium chloride was removed by filtration and the solvent was removed under reduced pressure. The residue was dissolved in one liter acetonitrile and 75 g of a 10N hydrochloric acid solution was added over 15 minutes. The mixture was stirred for 15 minutes at room temperature. N-[(4-vinylphenyl) methyl]butan-1-amine chlorohydrate was isolated by filtration, washed with acetonitrile and dried. 84 g (y: 50%) of N-[(4-vinylphenyl) methyl]butan-1-amine chlorohydrate was isolated. N-[(4-vinylphenyl) methyl]butan-1-amine chlorohydrate was analyzed with TLC on Rev C18 TLC plates, supplied by Buchi, eluent: MeOH/H$_2$O, R$_f$: 0.51.

Synthesis of MA-20:

64.4 g tert-butyl 3-oxobutanoate, 83.5 g N-[(4-vinylphenyl)methyl]butan-1-amine chlorohydrate, 55.5 g trimethylamine and 1.6 g BHT were dissolved in 400 ml toluene. The reaction was allowed to continue at reflux for two and a half hours, followed by slowly distilling 150 ml out of the reaction mixture. The reaction mixture was allowed to cool down to room temperature and 250 ml methyl tert-.butyl ether was added. The mixture was extracted twice with 350 ml water, once with a solution of 10 ml concentrated hydrochloric acid in 350 ml water and once with 350 ml water. The organic fraction was dried over MgSO$_4$ and evaporated under reduced pressure. 103 g of MA-20 was isolated, still containing a few percent residual solvents. MA-20 was analyzed with TLC chromatography on Rev C18 TLC plates, supplied by Büchi, eluent: methanol/water/0.5 M NaCl 70/15/15, R$_f$: 0.12.

MA-18 is a monomer [=N-(2-benzoyl-3-oxo-butyl)prop-2-enamide] according to general formula I and is prepared as follows:

175 g sulfuric acid was cooled to 0° C. 10.1 g hydroxymethyl acrylamide and 0.66 g BHT were added, followed by the portion wise addition of 16.2 g 1-phenylbutane-1,3-dione, while maintaining the temperature below 5° C. The reaction was allowed to continue for 20 hours at room temperature. The reaction mixture was added to 250 g ice. The mixture was extracted twice with 250 ml methylene chloride. The pooled methylene chloride fractions were extracted twice with 120 ml of a saturated NaHCO$_3$ solution and once with 100 ml brine. The methylene chloride fraction was dried over MgSO$_4$ and evaporated under reduced pressure. The residue was treated with 120 ml acetone and 400 ml n-hexane. The crude N-(2-benzoyl-3-oxo-butyl)prop-2-enamide was isolated by filtration. N-(2-benzoyl-3-oxo-butyl)prop-2-enamide was purified by preparative column chromatography on a Graceresolve column, using a gradient elution from methylene chloride to methylene chloride/ethyl acetate 60/40. 7.8 g (y: 31%) of N-(2-benzoyl-3-oxo-butyl)prop-2-enamide was isolated (TLC analysis on TLC Silica Gel 60 F$_{254}$ supplied by Merck, eluent methylene chloride/ethyl acetate 70/30, R$_f$: 0.3).

MA-17 is a monomer [N-(2-acetyl-3-oxo-butyl)prop-2-enamide] according to general formula I and is prepared as follows:

350 g sulfuric acid was cooled to 0° C. 20 g acetylacetone and 1.3 g BHT were added followed by the portion wise addition of 20.2 g (0.2 g) hydroxymethyl acrylamide, while maintaining the temperature below 7° C. The reaction was allowed to continue for 20 hours at room temperature. The reaction mixture was added to 500 g ice. The mixture was extracted twice with 500 ml methylene chloride. The pooled methylene chloride fractions were extracted with 250 ml of a saturated NaHCO$_3$ and 200 ml brine, dried over MgSO$_4$ and evaporated under reduced pressure. N-(2-acetyl-3-oxo-butyl)prop-2-enamide was purified by preparative column chromatography on a Prochrom LC80 column, using Kromasil Si 60A 10 μm as stationary phase and methylene chloride/ethyl acetate 80/20 as eluent. 4 g (y: 11%) of N-(2-acetyl-3-oxo-butyl)prop-2-enamide was isolated (TLC analysis on TLC Silica Gel 60 F$_{254}$ supplied by Merck, eluent methylene chloride/ethyl acetate 30/70, R$_f$: 0.33).

MA-22 is a monomer [N,N-diethyl-3-oxo-2-[(prop-2-enoylamino) methyl]butanamide] according to general formula I and is prepared as follows:

0.3 ml of 12 N HCl was added to a mixture of 31.44 g diethylacetoacetamide and 10.1 g hydroxymethyl acrylamide. 50 ml acetonitrile was added and the mixture was refluxed for 6 hours. The mixture was allowed to cool down to room temperature and the undissolved residues were removed by filtration. The solvent was removed under reduced pressure and the residue was treated with a mixture of 50 ml methyl t.-butyl ether and 50 ml hexane. The solvent was removed and N,N-diethyl-3-oxo-2-[(prop-2-enoylamino)methyl]butanamide was isolated by preparative column chromatography on a Prochrom LC80 column, using Kromasil Si 60A 10 μm as stationary phase and methylene chloride/ethyl acetate 50/50 as eluent. 5.8 g (y: 24%) of a N,N-diethyl-3-oxo-2-[(prop-2-enoylamino)methyl]butanamide was isolated (TLC analysis on TLC Silica Gel 60 F$_{254}$ supplied by Merck, eluent ethyl acetate, R$_f$: 0.25).

MA-21 is a monomer [tert-butyl 3-oxo-2-[(4-vinylphenyl)methyl]butanoate] according to general formula I and is prepared as follows:

15.2 g 4-chloromethyl-styrene, 7.91 g t.-butyl acetoacetate and 0.66 g BHT were dissolved in 140 ml acetonitrile. 13.8 g potassium carbonate was added. The reaction was allowed to continue 6 hours at reflux. The mixture was allowed to cool down to room temperature and 200 ml water was added. The mixture was extracted twice with 125 ml methyl t.-butyl ether. The pooled methyl t.butyl ether fractions were dried over MgSO$_4$ and evaporated under reduced pressure. Tert-butyl 3-oxo-2-[(4-vinylphenyl)methyl]butanoate was purified by preparative column chromatography on a Prochrom LC80 column, using Kromasil Si 60A 10 μm as stationary phase and methylene chloride/n.-hexane 50/50 as eluent. 3.4 g (y: 12.4%) of tert-butyl 3-oxo-2-[(4-vinylphenyl)methyl]butanoate was isolated (TLC analysis on TLC Silica Gel 60 F$_{254}$ supplied by Merck, eluent toluene, R$_f$: 0.2).

MA-16 is a monomer [3-[(4-vinylphenyl)methyl]pentane-2,4-dione] according to general formula I and is prepared as follows:

9.8 g acetyl acetone sodium salt, 7.15 g acetyl acetone, 0.34 g sodium iodide and 0.31 g BHT were dissolved in a mixture of 20 ml dimethyl formamide and 60 ml acetonitrile. 10.89 g 4-chloromethyl-styrene was added and the reaction mixture was heated to 80° C. The reaction was allowed to continue at 80° C. for two hours. The reaction mixture was allowed to cool down to room temperature. 150 ml water was added and the mixture was extracted twice with 120 ml toluene. The pooled toluene fractions were dried over $MgSO_4$ and evaporated under reduced pressure. 3-[(4-vinylphenyl)methyl]pentane-2,4-dione was purified by preparative column chromatography on a Prochrom LC80 column, using Kromasil Si 60A 10 μm as stationary phase and methylene chloride/n.-hexane 80/20 as eluent. 6.7 g (y: 43.4%) of 3-[(4-vinylphenyl)methyl]pentane-2,4-dione was isolated (TLC analysis on TLC Silica Gel 60 $F_{254}$ supplied by Merck, eluent dichloromethane, $R_f$: 0.55).

MA-23 is a monomer [2-[butyl(3-oxobutanoyl)amino]ethyl 2-methylprop-2-enoate] according to general formula I and is prepared as follows:

The synthesis of N-butyl-N-(2-hydroxyethyl)-3-oxo-butanamide:

23.43 g n-butyl-aminoethanol and 31.64 g t.-butyl acetoacetate were dissolved in 300 ml toluene and the reaction mixture was heated while gradually removing t.-butanol by distillation. 19 g of a solvent/t.-butanol mixture was removed by distillation. The reaction mixture was allowed to cool down and the solvent was removed under reduced pressure. The crude N-butyl-N-(2-hydroxyethyl)-3-oxo-butanamide was used without further purification.

The synthesis of 2-[butyl(3-oxobutanoyl)amino]ethyl 2-methylprop-2-enoate:

40 g N-(2-hydroxyethyl)-3-oxo-butanamide, 17.10 g methacrylic acid, 1.8 g p.-toluene sulfonic acid mono hydrate and 0.87 g BHT were dissolved in toluene. The mixture was heated to reflux and water was removed under azeotropic distillation. The reaction mixture was allowed to cool down to room temperature. The mixture was extracted two times with 150 ml of a saturated $NaHCO_3$ solution and twice with 100 ml water. The toluene fraction was isolated, dried over $MgSO_4$ and evaporated under reduced pressure. 2-[butyl(3-oxobutanoyl)amino]ethyl 2-methylprop-2-enoate was purified by preparative column chromatography on a Prochrom LC80 column, using Kromasil Si 60A 10 μm as stationary phase and methylene chloride as eluent. 8 g (y: 15%) of 2-[butyl(3-oxobutanoyl)amino]ethyl 2-methylprop-2-enoate was isolated (TLC-analysis on TLC Silica Gel 60 F254 supplied by Merck, eluent ethyl acetate, Rf: 0.6)

MA-14 is a monomer [N,N-diethyl-3-oxo-2-[(4-vinylphenyl)methyl]butanamide] according to general formula I and is prepared as follows:

400 ml ethanol was cooled to 0° C. 0.66 g 4-t.Bucatechol was added followed by the portionwise addition of 18.4 g (0.2 mol) of 15 w % sodium dispersion in paraffin. The reaction was allowed to continue for 30 minutes at 30° C. 30.5 g (0.2 mol) 4-chloromethyl-styrene was added, followed by flushing with 50 ml ethanol, immediately followed by the addition of 62.8 g (0.4 mol) diethylacetoacetamide and flushing with 50 ml ethanol. The reaction was allowed to continue for 16 hours at reflux temperature. The reaction mixture was allowed to cool down to room temperature. 500 ml water was added and the mixture was extracted with 400 ml methylene chloride. The precipitated paraffin in the organic fraction was removed by filtration. The aqueous fraction was extracted three times with 150 ml methylene chloride. The pooled organic fractions were extracted twice with 150 ml water. The organic fraction was isolated, dried over $MgSO_4$ and evaporated under reduced pressure. N,N-diethyl-3-oxo-2-[(4-vinylphenyl)methyl]butanamide was purified by preparative column chromatography on a Prochrom LC80 column, using Kromasil Si 60A 10 μm as stationary phase using a gradient elution from methylene chloride to methylene chloride/ethyl acetate 90/10. 27 g (y: 49%) of N,N-diethyl-3-oxo-2-[(4-vinylphenyl)methyl]butanamide was isolated (TLC-analysis on TLC Silica Gel 60 $F_{254}$ supplied by Merck, eluent methylene chloride, $R_f$: 0.3)

INV-POL-1: INV-DISP-1 is a copolymer of 2-(acetoacetoxy)ethyl methacrylate, phenoxyethyl methacrylate and methacrylic acid, prepared as described below.

10 g 2-(acetoacetoxy)ethyl methacrylate, 10 g phenoxyethyl methacrylate and 10 g methacrylic acid were dissolved in 235 ml ethyl acetate. The mixture was flushed with nitrogen for 45 minutes. 1.07 g dodecyl thiol was added, followed by the addition of a solution of 0.203 g WAKO V59 in 2 ml ethyl acetate. The polymerization was allowed to continue for 4 hours at reflux. The reaction mixture was allowed to cool down to room temperature and part of the polymer precipitated. The precipitated part of the polymer was isolated and treated with 100 ml methyl tert. butyl ether. 6.8 g of INV-POL-1 was isolated as a white powder. The molecular weight was determined, using GPC relative to poly(styrene) standards. INV-POL-1 had a number average molecular weight Mn of 28900 and a weight average molecular weight Mw of 44500.

INV-POL-2: INV-POL-2 is a copolymer of 2-(acetoacetoxy)ethyl methacrylate, benzyl methacrylate and methacrylic acid, prepared as described below.

10 g 2-(acetoacetoxy)ethyl methacrylate, 10 g benzyl methacrylate and 10 g methacrylic acid were dissolved in 240 ml ethyl acetate. The mixture was flushed with nitrogen for 45 minutes. 1.11 g dodecyl thiol was added, followed by the addition of a solution of 0.211 g WAKO V59 in 2 ml ethyl acetate. The polymerization was allowed to continue for 3 hours at reflux. The reaction mixture was allowed to cool down to room temperature. Part of the polymer precipitated and was isolated. The precipitated polymer was treated with 100 ml methyl tert.butyl ether. 9.3 g of INV-POL-2 was isolated as a white powder. The molecular weight was determined, using GPC relative to poly(styrene) standards. INV-POL-2 had a number average molecular weight Mn of 28500 and a weight average molecular weight Mw of 40500.

COMP-POL-1: COMP-POL-1 is a copolymer of 2-(ethoxy)ethyl methacrylate, phenoxyethyl methacrylate and methacrylic acid, prepared as described below.

10 g 2-ethoxy-ethyl methacrylate, 10 g 2-phenoxyethyl methacrylate and 10 g methacrylic acid were dissolved in 235 ml ethyl acetate. The mixture was flushed with nitrogen for 45 minutes. 1.15 g dodecyl thiol was added, followed by the addition of 0.219 g WAKO V59. The polymerization was allowed to continue for 4 hours at reflux. The reaction mixture was allowed to cool down to room temperature. Part of the polymer precipitated and was isolated. The precipitated polymer was treated with 300 ml methyl tert.butyl ether, isolated by filtration and dried. 8.7 g of COM-POL-1 was isolated as a white powder. The molecular weight was determined, using GPC relative to poly(styrene) standards. COMP-POL-1 had a number average molecular weight Mn of 24000 and a weight average molecular weight Mw of 32400.

COMP-POL-2: COMP-POL-2 is a copolymer of 2-(ethoxy)ethyl methacrylate, benzyl methacrylate and methacrylic acid, prepared as described below.

10 g 2-ethoxy-ethyl methacrylate, 10 g benzyl methacrylate and 10 g methacrylic acid were dissolved in 240 ml ethyl acetate. The mixture was flushed with nitrogen for 45 minutes. 1.19 g dodecyl thiol was added, followed by the addition of 0.227 g WAKO V59. The polymerization was allowed to continue for 4 hours at reflux. The reaction mixture was allowed to cool down to room temperature. Part of the polymer precipitated and was isolated. The precipitated polymer was treated with 300 ml methyl tert.butyl ether, isolated by filtration and dried. 7.2 g of COM-POL-2 was isolated as a white powder. The molecular weight was determined, using GPC relative to poly(styrene) standards. COMP-POL-2 had a number average molecular weight Mn of 24700 and a weight average molecular weight Mw of 33300.

INV-POL-3: INV-POL-3 is a copolymer of MA-20, acrylic acid and styrene, prepared as described below.

7 g styrene, 5.53 g MA-20, 5.25 g acrylic acid and 1.72 g dodecyl mercaptane were dissolved in 60 ml ethyl acetate. 0.49 g WAKO V59 was added and the mixture was flushed with nitrogen. The reaction mixture was heated to 75° C. and the polymerization was allowed to continue for 20 hours at 75° C. The reaction mixture was allowed to cool down to room temperature and 200 ml methyl t.-butyl ether was added. The precipitated polymer was isolated by filtration and dried at 50° C. 7 g (y: 35%) of INV-POL-3 was isolated.

AminoPOL-1: AminoPOL-1 is an amino functionalized alkoxysilane homopolymer prepared from aminopropyl-methyl-dimethoxysilane as described below.

35 g aminpropyl-methyl-dimethoxysilane was dissolved in 65 g water and the mixture was heated to 70° C. for 24 hours. The evaporated methanol was compensated with water up to 100 g of the polymer solution.

INV-POL-4 is a polymeric dispersing agent and is prepared as follows:

2.11 g phenoxyethyl acrylate, 1.56 g MA-17, 0.9 g acrylic acid and 0.34 g dodecyl mercaptane were dissolved in 15 ml ethyl acetate. 0.1 g WAKO V59 was added and the mixture was flushed with nitrogen. The reaction mixture was heated to 75° C. and the polymerization was allowed to continue for 20 hours at 75° C. The reaction mixture was allowed to cool down to room temperature and 200 ml n.-hexane was added. The precipitated polymer was isolated by filtration and dried at 50° C. 4.5 g (y: 90%) of INV-POL-4 was isolated.

INV-POL-5 is a polymeric dispersing agent and is prepared as follows:

1.57 g phenoxyethyl acrylate, 2.13 g MA-18, 0.9 g acrylic acid and 0.31 g dodecyl mercaptane were dissolved in 15 ml ethyl acetate. 0.09 g WAKO V59 was added and the mixture was flushed with nitrogen. The reaction mixture was heated to 75° C. and the polymerization was allowed to continue for 20 hours at 75° C. The reaction mixture was allowed to cool down to room temperature and 200 ml n.-hexane was added. The precipitated polymer was isolated by filtration and dried at 50° C. 4.5 g (y: 90%) of INV-POL-5 was isolated.

INV-POL-6 is a polymeric dispersing agent and is prepared as follows:

1.61 g phenoxyethyl acrylate, 2.07 g MA-22, 0.89 g acrylic acid and 0.34 g dodecyl mercaptane were dissolved in 15 ml ethyl acetate. 0.1 g WAKO V59 was added and the mixture was flushed with nitrogen. The reaction mixture was heated to 75° C. and the polymerization was allowed to continue for 20 hours at 75° C. The reaction mixture was allowed to cool down to room temperature and 200 ml n.-hexane was added. The precipitated polymer was isolated by filtration and dried at 50° C. 4.5 g (y: 90%) of INV-POL-6 was isolated.

INV-POL-7 is a polymeric dispersing agent and is prepared as follows: 1.33 g phenoxyethyl acrylate, 2.34 g MA-21, 0.89 g acrylic acid and 0.34 g dodecyl mercaptane were dissolved in 15 ml ethyl acetate. 0.1 g WAKO V59 was added and the mixture was flushed with nitrogen. The reaction mixture was heated to 75° C. and the polymerization was allowed to continue for 20 hours at 75° C. The reaction mixture was allowed to cool down to room temperature and 200 ml n.-hexane was added. The precipitated polymer was isolated by filtration and dried at 50° C. 2.7 g (y: 54%) of INV-POL-7 was isolated.

INV-POL-8 is a polymeric dispersing agent and is prepared as follows:

1.79 g phenoxyethyl acrylate, 1.88 g MA-16, 0.89 g acrylic acid and 0.34 g dodecyl mercaptane were dissolved in 15 ml ethyl acetate. 0.1 g WAKO V59 was added and the mixture was flushed with nitrogen. The reaction mixture was heated to 75° C. and the polymerization was allowed to continue for 20 hours at 75° C. The reaction mixture was allowed to cool down to room temperature and 200 ml n.-hexane was added. The precipitated polymer was isolated by filtration and dried at 50° C. 4 g (y: 80%) of INV-POL-8 was isolated.

INV-POL-9 is a polymeric dispersing agent and is prepared as follows:

3.96 g styrene, 3.25 g MA-23, 1.76 g acrylic acid and 0.8 g dodecyl mercaptane were dissolved in 30 ml ethyl acetate. 0.23 g WAKO V59 was added and the mixture was flushed with nitrogen. The reaction mixture was heated to 75° C. and the polymerization was allowed to continue for 20 hours at 75° C. An additional 0.2 g of WAKO V59 was added and the reaction was allowed to continue for an additional 4 hours at 75° C. The reaction mixture was allowed to cool down to room temperature and 300 ml n.-hexane was added. The precipitated polymer was isolated by filtration and dried at 50° C. 6.5 g (y: 65%) of INV-POL-9 was isolated.

INV-POL-10 is a polymeric dispersing agent and is prepared as follows:
  4.52 g phenoxyethyl acrylate, 2.86 g MA-20, 1.81 g acrylic acid and 0.63 g dodecyl mercaptane were dissolved in 30 ml ethyl acetate. 0.18 g WAKO V59 was added and the mixture was flushed with nitrogen. The reaction mixture was heated to 75° C. and the polymerization was allowed to continue for 20 hours at 75° C. The reaction mixture was allowed to cool down to room temperature and 200 ml n.-hexane was added. The precipitated polymer was isolated by filtration and dried at 50° C. 7.5 g (y: 75%) of INV-POL-10 was isolated.

INV-POL-11 is a polymeric dispersing agent and is prepared as follows:
  3.5 g styrene, 2.76 g MA-14, 2.63 g acrylic acid and 0.86 g dodecyl mercaptane were dissolved in 30 ml ethyl acetate. 0.25 g WAKO V59 was added and the mixture was flushed with nitrogen. The reaction mixture was heated to 75° C. and the polymerization was allowed to continue for 20 hours at 75° C. An additional 0.2 g of WAKO V59 was added and the reaction was allowed to continue for an additional 4 hours at 75° C. The reaction mixture was allowed to cool down to room temperature and 300 ml n.-hexane was added. The precipitated polymer was isolated by filtration and dried at 50° C. 8 g (y: 80%) of INV-POL-11 was isolated.

D.2. Methods

D.2.1. Solvent Resistance

The solvent resistance of formed images and coatings by applying the fluid sets is tested by wiping 40 times with a Q-tip over the coatings or printed images using isopropanol and methyl ethyl ketone as solvent or water.

A score of 0 means complete dissolution of the coating or image layer. A score of 1 means clear visible damage upon wiping. A score of 2 means minor visual damage upon wiping. A score of 3 means no or hardly noticeable damage on the coating or image.

D.2.2. Particle Size

The average particle size of the pigment dispersions was measured using a Zetasizer™ Nano-S (Malvern Instruments, Goffin Meyvis).

D.3. Example 1

This example illustrates the increased solvent resistance of coatings obtained by means of the fluid set according to the present invention.

A mixture of 1 g PV Fast blue BG-NIP (PB15:3, supplied by Clariant), 18 g water, 1 g of a polymer selected from INV-POL-1, INV-POL-2, COMP-POL-1 and COMP-POL-2, 0.2 g N-methyl morpholine and 100 g Yttrium stabilized zirconium oxide beads (0.4 mm) was milled for 24 hours. The Yttrium stabilized zirconium oxide beads were removed by filtration and the cyan dispersions INV-DISP-1, INV-DISP-2, COMP-DISP-1 and COMP-DISP-2 were used for the formulation of the inventive inks INV-INK-1 and INV-INK-2 and the comparative inks COMP-INK-1 and COMP-INK-2 respectively. The average particle sizes are given in the Table 4.

TABLE 4

| Dispersion | Average particle size (nm) |
|---|---|
| INV-DISP-1 | 220 |
| INV-DISP-2 | 260 |

TABLE 4-continued

| Dispersion | Average particle size (nm) |
|---|---|
| COMP-DISP-1 | 250 |
| COMP-DISP-2 | 185 |

The inventive inks INV-INK-1 and INV-INK-2 and the comparative inks INK-COMP-1 and INK-COMP-2 were prepared by mixing the components according to Table 5. All weight percentages are based on the total weight of the ink.

TABLE 5

| Wt. % of | INV-INK-1 | INV-INK-2 | COMP-INK-1 | COMP-INK-2 |
|---|---|---|---|---|
| INV-DISP-1 | 60 | — | — | — |
| INV-DISP-2 | — | 60 | — | — |
| COMP-DISP-1 | — | — | 60 | — |
| COMP-DISP-2 | — | — | — | 60 |
| Glycol | 17 | 17 | 17 | 17 |
| Dowanol DPM | 22 | 22 | 22 | 22 |
| Surfynol 104H | 1 | 1 | 1 | 1 |

The inventive inks INV-INK-1 and INV-INK-2 and the comparative inks COMP-INK-1 and COMP-INK-2 were coated on poly(propylene) (Priplak, supplied by Antalis), using a 4µ wired bar, and dried for 5 minutes at 80° C. in an oven. The coatings were evaluated for water and solvent resistance. On top of this coating, a coating of 0.5µ of AminoPOL-1 as co-reactive fluid, was applied and dried for 15 minutes in an oven at 80° C. The solvent resistance of the coatings was measured according to the method described above. Before measuring the solvent resistance, the coatings were stored at room temperature for 24 hours. The results are summarized in Table 6

TABLE 6

| | No overcoat | | | AminoPOL-1 overcoat | | |
|---|---|---|---|---|---|---|
| | water | IPA | MEK | water | IPA | MEK |
| INV-INK-1 | 3 | 2 | 0 | 3 | 3 | 2 |
| INV-INK-2 | 3 | 1 | 0 | 3 | 3 | 2 |
| COMP-INK-1 | 3 | 2 | 0 | 1 | 2 | 1 |
| COMP-INK-2 | 2 | 2 | 0 | 1 | 2 | 1 |

From Table 6, it becomes apparent that for only inks formulated with the dispersing agents, functionalized with monomer units according to the present invention, the solvent resistance significantly improves upon applying a co-reactive overcoat. Coatings based on comparative non-reactive dispersing agents tend to lose solvent resistance.

D.4. Example 2

This example illustrates the solvent resistance performance of coatings obtained by the fluid set wherein the inks comprise β-keto-amide functionalized dispersing agents after being aged.

A mixture of 1 g PV Fast blue BG-NIP, 18 g water, 1 g of INV-POL-3, 0.2 g triethyl amine and 100 g Yttrium stabilized zirconium oxide beads (0.4 mm) was milled for 7 days. The Yttrium stabilized zirconium oxide beads were removed by filtration and the cyan dispersion INV-DISP-3 was used for the formulation of the inventive ink INV-INK-3. The average particle size was 124 nm.

The inventive ink INV-INK-3 was prepared by mixing the components according to Table 7. All weight percentages are based on the total weight of the ink.

TABLE 7

| Wt % of | INV-INK-3 |
| --- | --- |
| INV-DISP-3 | 59 |
| Glycol | 17.4 |
| 1,2-propane diol | 21 |
| Triethyl amine | 1.7 |
| Surfynol 104H | 0.9 |

The inventive ink INV-INK-3 was coated on poly(propylene) (Priplak, supplied by Antalis), using a 4μ wired bar, and dried for 5 minutes at 80° C. in an oven. The coating was evaluated for water and solvent resistance according to the method described above. On top of this coating, a coating of 2μ of AminoPOL-1 as co-reactive fluid was applied and dried for 15 minutes in an oven at 80° C. The solvent resistance of the coating was measured after 7 days according to the method described above. INV-INK-3 was stored for 7 days at 60° C. and coated again using a 4μ wired bar, and dried for 5 minutes at 80° C. in an oven. On top of this second coating of 2μ of AminoPOL-1 as co-reactive fluid was applied and dried for 15 minutes in an oven at 80° C. The solvent resistance of the coating was measured after 7 days according to the method described above. The results are summarized in Table 8.

TABLE 8

|  | water | IPA | MEK |
| --- | --- | --- | --- |
| INV-INK-3 | 3 | 1 | 0 |
| INV-INK-3 + topcoat | 3 | 3 | 3 |
| INV-INK-3 + topcoat (7 d 60°) | 3 | 3 | 3 |

From Table 8, it becomes apparent that dispersing agents functionalized with β-keto-amides significantly improve the chemical resistance upon coating with a co-reactive overprint varnish, even after 7 days storage at 60° C.

D.5. Example 3

This example illustrates the scope of co-reactive monomers in the polymeric dispersing agents according to the present invention.

A mixture of 1 g PV Fast blue BG-NIP (PB15:3, supplied by Clariant), 18 g water, 1 g of a polymer selected from INV-POL-4 to INV-POL-11, 0.2 g N-methyl morpholine and 100 g Yttrium stabilized zirconium oxide beads (0.4 mm) was milled for 24 hours. The Yttrium stabilized zirconium oxide beads were removed by filtration and the cyan dispersions INV-DISP-4 to INV-DISP-11 were used for the formulation of the inventive inks INV-INK-4 to INV-INK-11. The average particle sizes are given in Table 9.

TABLE 9

| Pigment Dispersion | Dispersing agent | Average particle size (nm) |
| --- | --- | --- |
| INV-DISP-4 | INV-POL-4 | 75 |
| INV-DISP-5 | INV-POL-5 | 106 |
| INV-DISP-6 | INV-POL-6 | 95 |
| INV-DISP-7 | INV-POL-7 | 180 |
| INV-DISP-8 | INV-POL-8 | 215 |
| INV-DISP-9 | INV-POL-9 | 235 |
| INV-DISP-10 | INV-POL-10 | 140 |
| INV-DISP-11 | INV-POL-11 | 225 |

The inventive inks INV-INK-4 to INV-INK-11 were prepared by mixing the components according to Table 10. All weight percentages are based on the total weight of the ink.

TABLE 10

| Wt. % of | INV-INK-4 | INV-INK-5 | INV-INK-6 | INV-INK-7 | INV-INK-8 | INV-INK-9 | INV-INK-10 | INV-INK-11 |
| --- | --- | --- | --- | --- | --- | --- | --- | --- |
| INV-DISP-4 | 60 | — | — | — | — | — | — | — |
| INV-DISP-5 | — | 60 | — | — | — | — | — | — |
| INV-DISP-6 | — | — | 60 | — | — | — | — | — |
| INV-DISP-7 | — | — | — | 60 | — | — | — | — |
| INV-DISP-8 | — | — | — | — | 60 | — | — | — |
| INV-DISP-9 | — | — | — | — | — | 60 | — | — |
| INV-DISP-10 | — | — | — | — | — | — | 60 | — |
| INV-DISP-11 | — | — | — | — | — | — | — | 60 |
| Glycol | 17.5 | 17.5 | 17.5 | 17.5 | 17.5 | 17.5 | 17.5 | 17.5 |
| 1,2-propane diol | 22 | 22 | 22 | 22 | 22 | 22 | 22 | 22 |
| Surfynol 104H | 0.5 | 0.5 | 0.5 | 0.5 | 0.5 | 0.5 | 0.5 | 0.5 |

Amino overcoat AM-OV-1 was prepared by mixing the components according to Table 11.

TABLE 11

| Wt. % of | AM-OV-1 |
| --- | --- |
| AminoPOL-1 | 20 |
| 1,2-propane diol | 40 |
| Surfynol 104H | 0.25 |
| Water | 39.75 |

The inventive inks INV-INK-4 to INV-INK-11 were coated on poly(propylene) (Priplak, supplied by Antalis), using a 4μ wired bar, and dried for 5 minutes at 80° C. in an oven. The coatings were evaluated for water and solvent resistance. On top of this coating, a coating of 10μ of AM-OV-1 as co-reactive fluid was applied and dried for 15 minutes at 80° C. in an oven. The solvent resistance of the coatings was measured according to the method described above. Before measuring the solvent resistance, the coatings were stored at room temperature for 7 days. The results are summarized in Table 12.

TABLE 12

|  | No overcoat | | | AM-OV-1 overcoat | | |
|---|---|---|---|---|---|---|
|  | water | IPA | MEK | water | IPA | MEK |
| INV-INK-4 | 1 | 1 | 0 | 2 | 2 | 2 |
| INV-INK-5 | 2 | 1 | 0 | 2 | 2 | 2 |
| INV-INK-6 | 0 | 1 | 0 | 3 | 2 | 2 |
| INV-INK-7 | 3 | 0 | 0 | 3 | 3 | 3 |
| INV-INK-8 | 3 | 1 | 0 | 3 | 3 | 3 |
| INV-INK-9 | 2 | 1 | 0 | 2 | 3 | 2 |
| INV-INK-10 | 1 | 0 | 0 | 3 | 2 | 1 |
| INV-INK-11 | 3 | 1 | 0 | 2 | 2 | 2 |

From Table 12 it becomes apparent that a broad scope of dispersing agents according to the present invention result in a significant increase in solvent resistance upon reacting with a primary amine functionalized polymer containing over-print varnish.

The invention claimed is:

1. A fluid set comprising an aqueous ink jet ink and a co-reactive fluid, the ink jet ink comprises a pigment and a polymeric dispersing agent having a functional group represented by formula I, formula II, or formula III, the co-reactive fluid comprises a compound having at least two functional groups selected from the group consisting of primary amines and secondary amines:

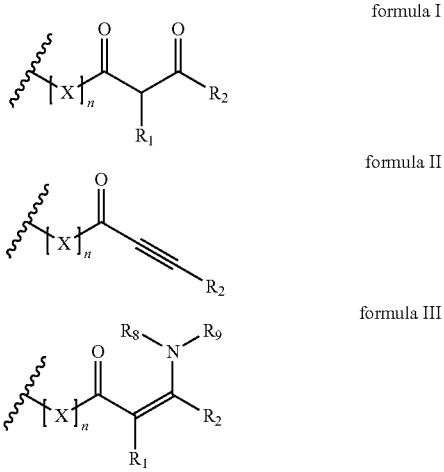

wherein
$R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$, and CN;
$R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, and $COR_3$;
or $R_1$ and $R_2$ represent the necessary atoms to form a five to eight membered ring;
$R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$, and $NR_5R_6$;
$R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;
$R_5$ and $R_6$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;
or $R_5$ and $R_6$ represent the necessary atoms to form a five to eight membered ring;
X is selected from the group consisting of O and $NR_7$;
n represents 0 or 1;
$R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group; and
$R_8$ and $R_9$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_8$ and $R_9$ represent the necessary atoms to form a five to eight membered ring.

2. The fluid set of claim 1, wherein the polymeric dispersing agent comprises at least 15 mol % of monomeric units having a functional group according to formula I relative to the total monomer composition.

3. The fluid set of claim 1, wherein the compound is a resin particle, having at least 5 functional groups selected from the group consisting of a primary amine and a secondary amine.

4. The fluid set of claim 1, wherein the compound is di- or trifunctional.

5. The fluid set of claim 3, wherein the resin particle is crosslinked.

6. The fluid set of claim 3, wherein the resin particle comprises a resin having at least one repeating unit comprising a primary amine.

7. The fluid set of claim 6, wherein the primary amine is selected from the group consisting of a vinyl amine and an allyl amine.

8. The fluid set of claim 1, wherein the co-reactive fluid comprises a flocculating agent selected from the group of multivalent salts and cationic resins.

9. The fluid set of claim 8, wherein the co-reactive fluid further comprises a white pigment.

10. The fluid set of claim 1, wherein the co-reactive fluid comprises a colorant.

11. The fluid set of claim 1, wherein the co-reactive fluid comprises an acrylic based resin, a urethane based resin, or a polyethylene wax.

12. The fluid set of claim 6, wherein the co-reactive fluid comprises an acrylic based resin, a urethane based resin, or a polyethylene wax.

13. An inkjet recording method using the fluid set as defined in claim 1 comprising the steps of:
   a) jetting the aqueous inkjet ink as defined in claim 1 onto a substrate;
   b) applying the co-reactive fluid as defined in claim 1 before, after, or during the jetting of the inkjet ink; and
   c) drying the applied fluid set by applying heat such as to obtain a temperature of the jetted ink of at least 60° C.

14. An inkjet recording method using the fluid set as defined in claim 6 comprising the steps of:
   a) jetting the aqueous inkjet ink as defined in claim 6 onto a substrate;
   b) applying the co-reactive fluid as defined in claim 6 before, after, or during the jetting of the inkjet ink; and
   c) drying the applied fluid set by applying heat such as to obtain a temperature of the jetted ink of at least 60° C.

* * * * *